United States Patent
Martin de Nicolas et al.

(10) Patent No.: US 12,369,049 B2
(45) Date of Patent: Jul. 22, 2025

(54) CONTROLLING NETWORK NODE, AND METHOD PERFORMED THEREIN

(71) Applicant: Telefonaktiebolaget LM Ericsson (publ), Stockholm (SE)

(72) Inventors: Arturo Martin de Nicolas, Brussels (BE); Calin Curescu, Hässelby (SE); Peter Woerndle, Würselen (DE); Staffan Blau, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 491 days.

(21) Appl. No.: 17/797,144

(22) PCT Filed: Feb. 4, 2021

(86) PCT No.: PCT/EP2021/052675
§ 371 (c)(1),
(2) Date: Aug. 3, 2022

(87) PCT Pub. No.: WO2021/156374
PCT Pub. Date: Aug. 12, 2021

(65) Prior Publication Data
US 2023/0062410 A1    Mar. 2, 2023

Related U.S. Application Data

(60) Provisional application No. 62/970,733, filed on Feb. 6, 2020.

(51) Int. Cl.
*H04W 4/00* (2018.01)
*H04L 41/0806* (2022.01)
(Continued)

(52) U.S. Cl.
CPC ......... *H04W 24/02* (2013.01); *H04L 41/0806* (2013.01); *H04L 41/0895* (2022.05);
(Continued)

(58) Field of Classification Search
CPC . H04L 41/0895; H04L 41/0806; H04L 41/40; H04L 41/5054; H04W 24/02; H04W 76/15
(Continued)

(56) References Cited

U.S. PATENT DOCUMENTS 10,129,108 B2 * 11/2018 Vrzic .................. H04L 41/40
10,362,122 B2 *  7/2019 Cillis ............... H04L 41/0894
(Continued)

FOREIGN PATENT DOCUMENTS

EP    3723325 A1    10/2020
EP    3806390 A1     4/2021
(Continued)

OTHER PUBLICATIONS

Author Unknown, "Network Functions Virtualisation (NFV) Release 3; Management and Orchestration; Or-Vnfm reference point—Interface and Information Model Specification," Draft Document GS NFV-IFA 007, Version 3.2.2, May 2019, ETSI, 192 pages.
(Continued)

*Primary Examiner* — Marceau Milord
(74) *Attorney, Agent, or Firm* — Withrow & Terranova, PLLC

(57) ABSTRACT

Embodiments herein disclose for example a method performed by a controlling network node for handling one or more virtual network functions (VNF) in a communication network. The controlling network node initiates a setup of virtual resources for a VNF, wherein an aggregating connection point (CP), indicates a set of CPs to be connected to a same external virtual link. The controlling network node transmits configuration data to a managing function wherein the configuration data comprises an indication.

10 Claims, 14 Drawing Sheets

(51) Int. Cl.
*H04L 41/0895* (2022.01)
*H04L 41/40* (2022.01)
*H04L 41/5054* (2022.01)
*H04W 24/02* (2009.01)
*H04W 76/15* (2018.01)
*H04L 41/0893* (2022.01)
*H04L 41/342* (2022.01)

(52) U.S. Cl.
CPC .......... *H04L 41/40* (2022.05); *H04L 41/5054* (2013.01); *H04W 76/15* (2018.02); *H04L 41/0893* (2013.01); *H04L 41/342* (2022.05)

(58) Field of Classification Search
USPC .......................................................... 370/329
See application file for complete search history.

(56) References Cited

U.S. PATENT DOCUMENTS

| | | | | |
|---|---|---|---|---|
| 10,719,348 | B2* | 7/2020 | Zembutsu | G06F 9/46 |
| 10,965,523 | B1* | 3/2021 | Johnson | H04L 41/0803 |
| 10,999,219 | B1* | 5/2021 | Athreyapurapu | H04L 41/0806 |
| 11,757,696 | B2* | 9/2023 | Toeroe | H04L 41/0233 709/223 |
| 11,855,855 | B2* | 12/2023 | Chen | H04L 47/781 |
| 11,889,391 | B2* | 1/2024 | Shan | H04W 12/08 |
| 12,088,516 | B2* | 9/2024 | Mondal | H04L 5/0035 |
| 12,095,690 | B2* | 9/2024 | Xiong | H04W 72/0453 |
| 2011/0216775 | A1* | 9/2011 | Gargett | H04L 12/4641 370/395.5 |
| 2017/0142591 | A1* | 5/2017 | Vrzic | H04W 76/12 |
| 2017/0272523 | A1* | 9/2017 | Cillis | H04L 41/0894 |
| 2018/0013586 | A1* | 1/2018 | Wang | H04L 61/5007 |
| 2019/0149408 | A1 | 5/2019 | Li | |
| 2020/0186442 | A1* | 6/2020 | Nazarzadeoghaz | H04L 41/5045 |
| 2020/0275357 | A1* | 8/2020 | Bordeleau | H04L 41/0806 |
| 2021/0176112 | A1* | 6/2021 | Cherunni | H04L 41/04 |
| 2021/0194749 | A1* | 6/2021 | Toeroe | H04L 41/40 |
| 2022/0085931 | A1* | 3/2022 | Mondal | H04W 72/044 |
| 2022/0159501 | A1* | 5/2022 | Chou | H04L 41/40 |
| 2022/0166580 | A1* | 5/2022 | Zhu | H04L 27/2636 |
| 2022/0167407 | A1* | 5/2022 | Oviedo | H04W 72/0446 |
| 2022/0167448 | A1* | 5/2022 | Palle | H04W 76/16 |
| 2022/0183049 | A1* | 6/2022 | Lee | H04W 76/20 |
| 2022/0224566 | A1* | 7/2022 | Yu | H04L 67/143 |
| 2022/0417112 | A1* | 12/2022 | Chen | H04L 41/40 |

FOREIGN PATENT DOCUMENTS

| | | |
|---|---|---|
| WO | 2018229559 A1 | 12/2018 |
| WO | 2019127418 A1 | 7/2019 |
| WO | 2019233124 A1 | 12/2019 |

OTHER PUBLICATIONS

Author Unknown, "Network Functions Virtualisation (NFV) Release 3; Management and Orchestration; VNF Descriptor and Packaging Specification," GS NFV-IFA 011, Version 3.3.1, Sep. 2019, ETSI, 85 pages.

Author Unknown, "Network Functions Virtualisation (NFV) Release 2; Protocols and Data Models; NFV descriptors based on TOSCA specification," GS NFV-SOL 001, Version 2.7.1, Jan. 2020, ETSI, 304 pages.

Author Unknown, "Network Functions Virtualisation (NFV) Release 2; Protocols and Data Models; RESTful protocols specification for the Or-Vnfm Reference Point," GS NFV-SOL 003, Version 2.7.1, Dec. 2019, ETSI, 301 pages.

International Search Report and Written Opinion for International Patent Application No. PCT/EP2021/052675, mailed May 3, 2021, 12 pages.

* cited by examiner

CONTROLLING NETWORK NODE, AND METHOD PERFORMED THEREIN

This application is a 35 U.S.C. § 371 national phase filing of International Application No. PCT/EP2021/052675, filed Feb. 4, 2021, which claims the benefit of provisional patent application Ser. No. 62/970,733, filed Feb. 6, 2020, the disclosures of which are incorporated herein by reference in their entireties.

TECHNICAL FIELD

Embodiments herein relate to a controlling network node, and a method performed therein for communication. Furthermore, a computer program product and a computer readable storage medium are also provided herein. In particular, embodiments herein relate to handling Network Function Virtualization in a European Telecommunications Standards Institute (ETSI) Network Functions Virtualization (NFV)— Management and Orchestration (MANO) architecture.

BACKGROUND

In a typical communication network, User equipments (UE), also known as wireless communication devices, mobile stations, stations (STA) and/or wireless devices, communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB, or a gNodeB. A service area or cell area is a geographical area where radio coverage is provided by the radio network node. The radio network node communicates over an air interface operating on radio frequencies with the UE within range of the radio network node.

The ETSI Network Function Virtualization (NFV) framework is one of the foremost Orchestration and Management frameworks for Virtualized Network Function (VNF) lifecycle management with a widespread acceptance and support in the Telecom Industry.

In the ETSI NFV Lifecycle Management and Orchestration (ETSI NFV-MANO) architecture (se FIG. 1) for orchestration and life-cycle management of virtualized networks and virtualized network function (VNF) applications, the NFV Orchestrator (NFVO) interacts with the virtualization infrastructure manager (VIM) of a cloud to set up and manage networking resources such as data storage, processor capacity and similar (except those that are internal to the VNF, i.e. used for communication among VNF components), while it delegates to a VNF Manager (VNFM) to interact with the VIM in order to orchestrate and manage the compute and storage resources and networking interfaces needed in the cloud for a VNF instance.

On the higher level, Network Service (NS) Descriptors (NSD) (i.e. templates) exist that contain amongst others several VNFs and virtual links (VL). The NSDs are orchestrated by the NFVO which in its turn delegates the orchestration of the individual VNFs to the relevant VNFM or VNFMs.

The FIG. 1 is from "https://www.etsi.org/technologies/nfv" and shows the NFV-MANO architectural components and what ETSI specifications that relates to the different components and interfaces.

The VNFM bases the interactions with the Virtual Infrastructure Manager (VIM) of a cloud infrastructure on a combination of:
a) Information in the VNF Descriptor (VNFD), which may be a Topology and Orchestration Specification for Cloud Applications (TOSCA) Service Template that is delivered together with the software for the VNF. The VNFD (including all its components) is specified in accordance with the ETSI GS NFV-IFA011 and implemented using TOSCA service templates as described in the ETSI GS NFV-SOL001 specification, using a declarative syntax to model the VNFs network interfaces, its storage needs, its compute resource needs, its supported instantiation levels, supported deployment variations, and lifecycle management operations.
b) Information received from NFVO over the Or-Vnfm reference point. The VNFD is deployment agnostic—details like IP addresses, what deployment level to use, how many deployment units, e.g. virtual machines (VM) or Containers, to instantiate, etc. is information that the NFVO will provide to the VNFM for each particular VNF instance it wants to be created by the VNFM. The information elements used in the communication over the Or-Vnfm reference point is specified in ETSI GS NFV-SOL003.

With regards to computer networking, an application comprises of one or more deployment units, e.g. VMs, Containers, central processing unit (CPU) boards, that in the VNFD is modelled by a concept called Virtual Deployment Unit (VDU). These deployments have network interfaces to connect to a virtual link (VL) representing the underlying network transport technology, such as virtual local area network (VLAN), Virtual Extensible LAN (VXLAN), generic routing encapsulation (GRE), etc., through which they can communicate with other application units, via internal VLs, and/or with the outside world, via external VLs. These network interfaces are modelled in the VNFD with a concept called Connection Point Descriptors (CPD). A CPD normally models an Ethernet interface, on a VDU, that connects the VDU to a network, such network interfaces are often referred to as access ports, or it may represent a network interface via which the VDU connects to multiple networks (such network interfaces are commonly referred to as trunk ports). A CPD may also represent a port in a router (this is the case when a VnfExtCp is connected to an internal VL rather than being a re-exposure of a VduCp). A CPD may also represent a virtual connection point allowing to access a set of VNFComponent instances (e.g. used to model access to services provided by containerized environments such as Kubernetes).

A CPD can be of a VduCpd type and describes network connectivity between a VNF instance (based on a VDU) and an internal VL (or external VL if the VduCp is re-exposed as a VnfExtCp), or it can be of a VipCpd type where it is used to model the allocation of virtual IP addresses that can be shared by other CPs, or it can be of a VnfExtCpd type, enabling this VNF to connect with an external VL, i.e. connecting an internal VL to an external VL.

A CP of VnfExtCp type enables the VNF to connect with an external VL. This can be achieved as a re-exposure of a VduCp, VipCp, etc. as a VnfExtCp, or by connecting an internal VL to an external VL. In the latter case, the VnfExtCp typically represents a port in a router.

Data to configure VnfExtCp instances is received in Or-Vnfm (NFVO→VNF) e.g. at VNF instantiation.

SUMMARY

For many use-cases it is important that several VDUs connect inside a VNF to the same external network, as represented by an external virtual link. In other words, that certain CPs (VduCps or VipCps or VnfExtCps), that are exposed externally, get connected to the same NsVirtualLink. This is information known by the designer of the VNFD, which is also the decision maker, and is of no concern to the NSD designer. This is a VNF design decision, due to service coordination, or isolation or any other purposes.

Moreover, a VNF vendor may need to be able to create a set of VNF types that can be used in the NSD without requiring to change the NSD topology when we change the VNFs internal implementation. With the current modelling, if a new VDU descriptor that has a VnfExtCp is added, a new VnfExtCp is added. Thus, a new requirement to the VNF TOSCA type is needed to be added, thus impacting the NSD topology design too. With the current modelling it is not possible for the VNF designer to specify that he wants to connect several connection points (CP) within the VNF to the same external virtual link (VL). As of now, the only options are:

1. Expose internal CPs as external CPs
   But then the VNF designer does not control how the CPs are connected externally in the NSD, they may be connected by the NSD designer to several external VLs. Note that the templates should be self-contained and not rely on a hidden information to be sent from VNF designer to NSD designer (so that he knows how to connect the external VLs).
   Furthermore, if the VNF vendor wants to change the internal design of the VNF, e.g. adding a new VDU with a new VnfExtCp, it will make an impact on the NSD topology design.
2. Create an internal virtual link in the VNF, and one external CP that is exposed by the VNF.
   The internal VL is connected to the external CP, allowing connection of several internal CPs via the internal VL to the external CP. Unfortunately, this is not a valid solution as the external CP is the only interface to the external VL.
   Thus, the internal CPs are not anymore directly connected to the external VL, and thus not directly configurable by the NFVO. What is desired is that several internal CPs connect to the same external virtual link without any routing or translation.
   Moreover, this external CP will need to rely on an underlying virtual routing functionality in the VNF which in most cases is not available.
   Furthermore, it requires the creation of an additional virtual link, which may not be acceptable by a customer.

An object of embodiments herein is to provide a mechanism for improving management and configurability and/or usability, of a communication network in an efficient manner when handling VNFs.

According to an aspect the object may be achieved by a method performed by a controlling network node for handling one or more VNFs in a communication network. The controlling network node initiates a setup of virtual resources for a VNF wherein an aggregating connection point (CP) indicates a set of CPs to be connected to a same external virtual link. CP herein meaning a connection point that models a virtual network interface, e.g. an ethernet interface on a virtual deployment unit (VDU), a port in a virtual router, etc. The controlling network node may use a model of the VNF with the special connection point for aggregating and connecting the set of CPs to a same external virtual link, in addition to e.g. VNFs network interfaces, its storage needs, its compute resource needs, its supported instantiation levels, supported deployment variations, and/or lifecycle management operations. The controlling network node transmits configuration data to a managing function wherein the configuration data comprises an indication to connect the set of CPs, grouped by the aggregating CP, to the same external virtual link, e.g. may transmit indications on how to connect the set of CPs to the same external virtual link.

According to another aspect the object may be achieved by providing a controlling network node, e.g. an NFV MANO node, for handling one or more VNFs in a communication network. The controlling network node is configured to initiate a setup of virtual resources for a VNF wherein an aggregating CP indicates a set of CPs to be connected to a same external virtual link, i.e. a special connection point is aggregating a connection of the set of CPs to the same external virtual link. The controlling network node may further be configured to use the model of the VNF with the aggregating CP for aggregating and connecting the set of CPs to the same external virtual link, in addition to e.g. the VNFs network interfaces, its storage needs, its compute resource needs, its supported instantiation levels, supported deployment variations, and/or lifecycle management operations. The controlling network node is further configured to transmit configuration data to a managing function wherein the configuration data comprises an indication to connect the set of CPs, grouped by the aggregating CP, to the same external virtual link, e.g. to transmit indications on how to connect the set of CPs to the same external virtual link.

It is furthermore provided herein a computer program product comprising instructions, which, when executed on at least one processor, cause the at least one processor to carry out any of the methods above, as performed by the controlling network node. It is additionally provided herein a computer-readable storage medium, having stored thereon a computer program product comprising instructions which, when executed on at least one processor, cause the at least one processor to carry out the method according to any of the methods above, as performed by the controlling network node.

Embodiments propose a method and controlling network node for specifying and using the aggregating CP in the context of ETSI NFV MANO network modelling that allows to expose externally the set of CPs with the requirement to connect them to the same external virtual link.

The new CP node type, also denoted as an aggregator-ExtCp, may be used to connect several CPs, either exposed VduCps, or VipCps, or VnfExtCps to an external NsVirtualLink. In the information model (stage 2), the aggregator-ExtCp is connected to one external VL (NsVirtualLink). By that, all aggregated Cps get connected to the same external VL. In the TOSCA data model (stage 3), the aggregator-ExtCp exposes a single TOSCA requirement for a VirtualLinkable capability which is matched by that capability of an NsVirtualLink at NSD design.

In addition, in the TOSCA data model, the aggregator-ExtCp exposes also a VirtualLinkable capability, thus, acting as VL towards the Cps it is aggregating. By that, the definition of the Cps is not affected by the introduction of the new CP node.

Embodiments solve one or more of the following problems in the modeling of a VNF in the information model (IFA011) and TOSCA specification SOL001: Allow to connect several CPs such as VnfExtCps to the same external VL can be expressed formally in the VNFD.

Changes in the internal topology of the VNF that result in adding a new Cp connected to the same external network have minimum impact in the NSD:
No impact in the NSD topology
No need to coordinate across organizations with the NSD designer
No unnecessary exposure of VNF internal information to the NSD designer
Thus, the choice and decision belong solely to the VNF designer.
Note: The impact may be that node type of the VNF node template has to change, since in the current NFV model the VNF node type is bound to a specific (one single) value of certain properties (VnfdId, version, etc.).

Thus modelling a VNF and/or configuring managing function e.g. a VNFM using the aggregating node is performed efficiently and leading to an improved management and usability, of the communication network when handling VNFs.

BRIEF DESCRIPTION OF THE DRAWINGS

Embodiments will now be described in more detail in relation to the enclosed drawings, in which.

DETAILED DESCRIPTION

Figure 1:
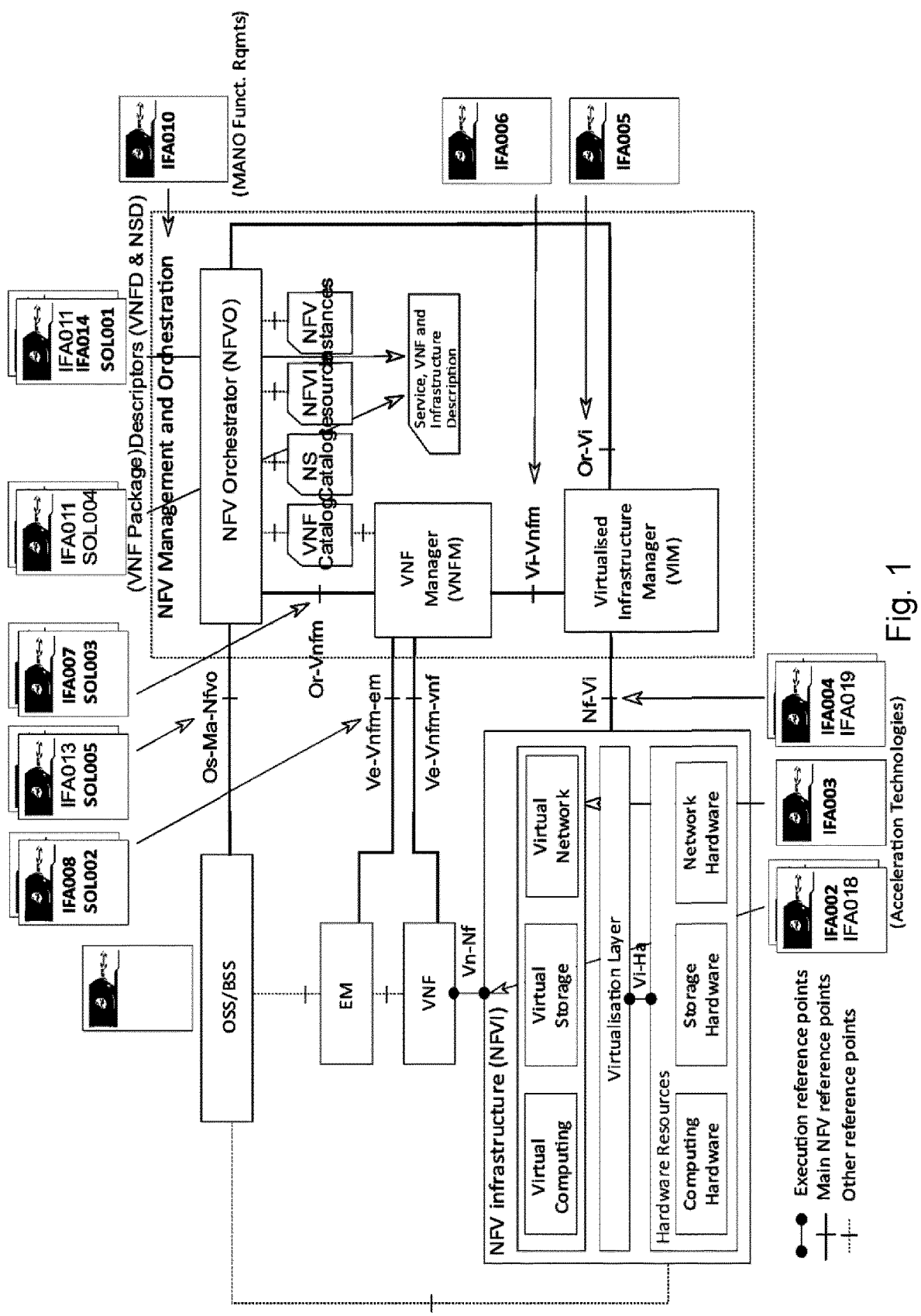
FIG. 1 shows the NFV-MANO architectural components according to prior art.
Figure 2:
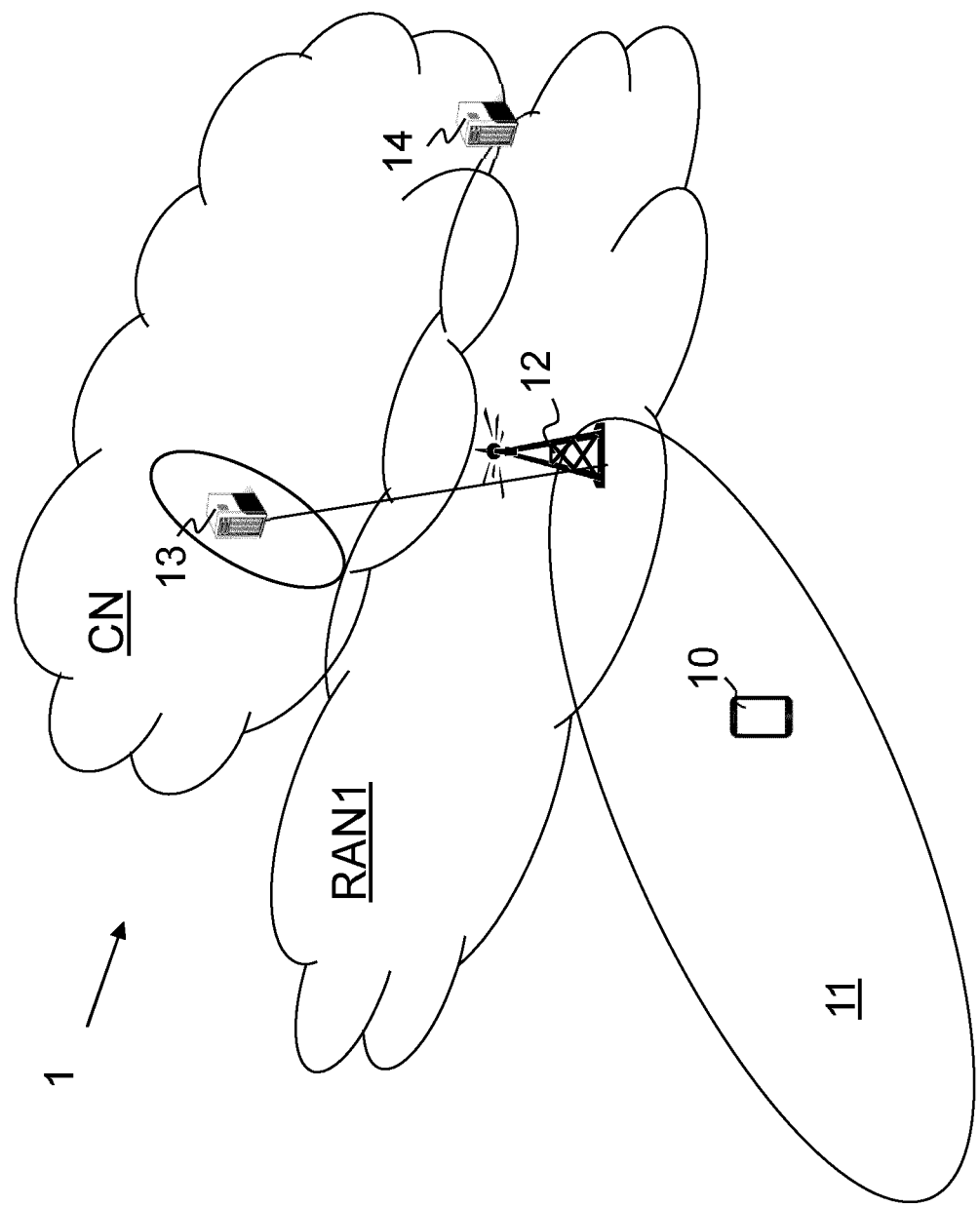
FIG. 2 is a schematic overview depicting a communication network according to embodiments herein.

Embodiments herein relate to communication networks in general FIG. 2 is a schematic overview depicting a communication network 1. The communication network 1 comprises one or more access networks, such as radio access networks (RAN) e.g. a first RAN (RAN1), connected to one or more core networks (CN). The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, user equipments (UE) e.g. a UE 10 such as a mobile station, a non-access point (non-AP) station (STA), a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things (IoT) operable device, Device to Device (D2D) terminal, mobile device e.g. smart phone, laptop, mobile phone, sensor, relay, mobile tablets or any device communicating within a cell or service area.

The communication network 1 comprises a radio network node 12 providing radio coverage over a geographical area, a service area 11 or a cell, of a first radio access technology (RAT), such as New Radio (NR), LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the radio network node 12 depending e.g. on the first radio access technology and terminology used.

The communication network 1 further comprises a network node 13 such as a RAN node and/or a core network node e.g. Radio Software Defined Networking (SDN) node, an Access and Mobility Management Function (AMF) node, an mobility management entity (MME), a serving gateway (S-GW), a Serving GPRS Support Nodes (SGSN) node, or corresponding node in e.g. a 5G network or similar. The GPRS meaning General Packet Radio Services.

Embodiments herein relate to VNFs and the implementation of a NFV-MANO architecture for virtualization of using network resources of the RAN, IP Multimedia Subsystem (IMS) and/or the CN, e.g. resources of the radio network node 12 and the network node 13. Embodiments herein extends capabilities of the NFV-MANO standard framework to, from an orchestration and management point of view, model trunk port attachments to multiple networks for e.g. "virtual machines" and "operating system containers" that are the software deployment units of a Virtual Network Function (VNF) product.

The NFV-MANO instructs what and where the resources, such as processing capacity and memory storage, are localized and used for a virtual network. The NFV-MANO architecture comprises a controlling network node 14 that may comprise a NFVO that delegates the orchestration of the individual VNFs to a managing function such as a VNFM. The controlling network node 14 may further comprise the managing function. The NFVO provides deployment specific parameters such as e.g. IP addresses, what deployment level to use, how many deployment units e.g. VMs or Containers to instantiate, etc. to the managing function for a VNF instance to be created by the managing function. It should be noted that the controlling network node 14 may be a standalone node or a distributed network node comprising functions distributed over several network nodes.

Figure 3:
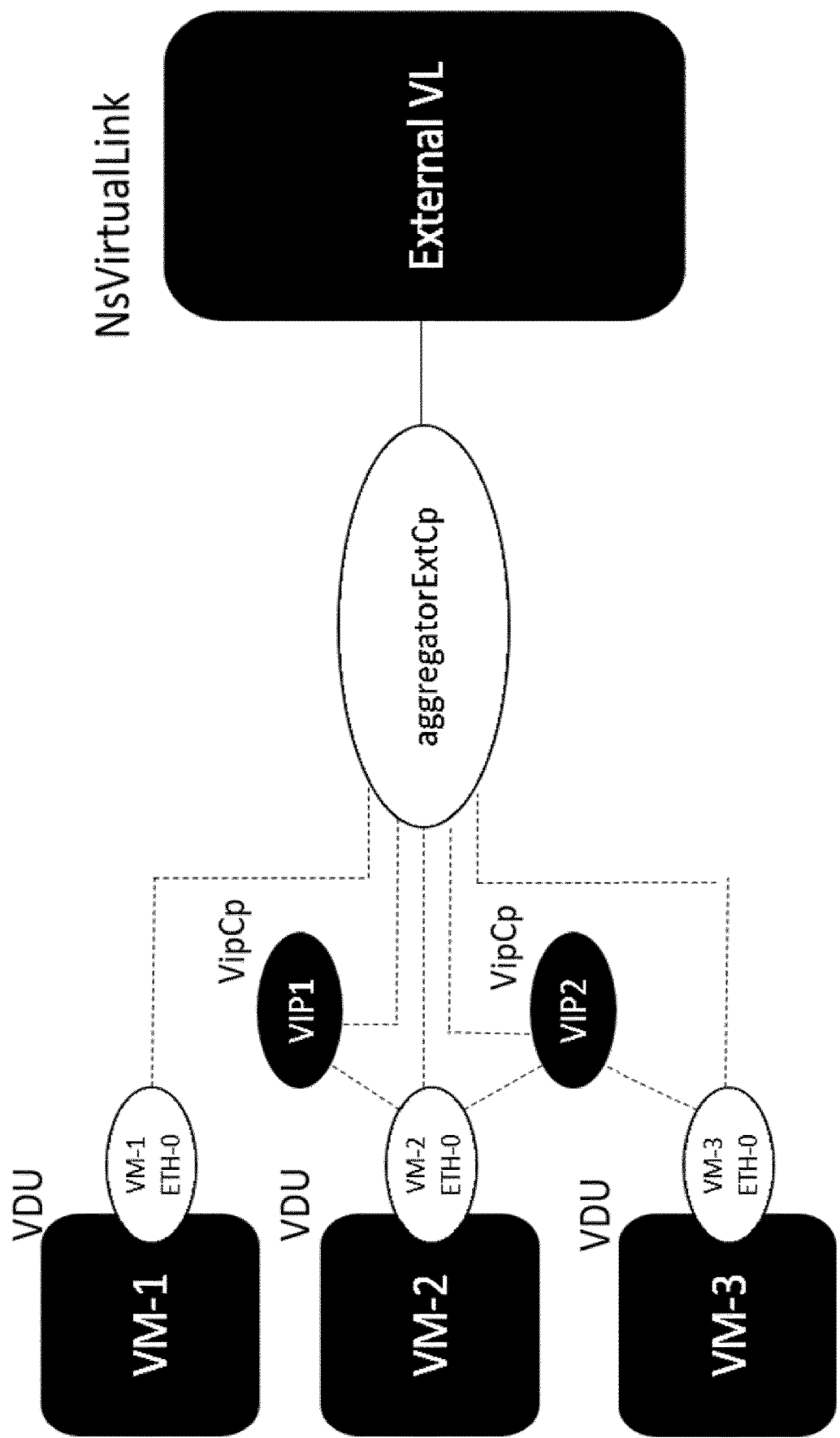
FIG. 3 is a block diagram depicting a special CP (aggregatorExtCp) in the information model according to embodiments herein.

According to embodiments herein the NFVO of the controlling network node 14 configures setup of a VNF in the communication network. Hence, the controlling network node 14 initiates a setup of virtual resources wherein an aggregating CP indicates a set of CPs to be connected to a same external VL, thus, a connection point (type) aggregating and connecting a set of CPs to the same external virtual link is modelled and/or executed. According to embodiments herein a method and the controlling network node 14 are provided for specifying and using a special connection point (CP), i.e. the aggregating CP, in the context of NFV-MANO network modelling that allows to expose the set of CPs with a requirement to connect to a same external virtual link. Thus, providing the set of CPs with the requirement to connect to the same external virtual link. The aggregating CP denoted as aggregatorExtCp is there for modelling, basically saying that the set of CPs "covered" by the aggregating CP connects to the particular external virtual link to which the aggregating CP is connected. A VNFD can indicate that certain CPS such as VduCps, or VipCps, or VnfExtCps, are connected to the aggregating CP. Thus, the connectivity of this aggregating CP to an external VL may be defined in an NSD. The logical representation of the involved entities is shown in FIG. 3, i.e. a representation of the external connectivity of a VNF using the novel entity. In FIG. 3 VIP1 and VIP2 are IP addresses for services that for high availability reasons or for capacity scaling reasons are supported on several VM instances. Vio1 for example addresses a service that is supported by all VM instances of the VM-2 type, and VIP2 addresses a service that is supported by all VM instances both of VM-2 type and VM-3 type.

In the VNFD an indication such as a new aggregatorExtCpd Information Element may indicate the references to the internal CPs, e.g. VduCps or VipCps, that are aggregated as shown in Table 1.

| Attribute | Qualifier | Cardinality | Content | Description |
|---|---|---|---|---|
| intCpd | M | 0...N | Identifier (reference to VduCpd) | References the internal VDU CP descriptors which are used to instantiate internal CP instances. These internal VDU CPDs are aggregated by the aggregatorExtCp and exposed as one extCpd. See note. |
| vipCpd | M | 0...n | Identifier (reference to internal VipCpd) | References the internal VipCp descriptors which are used to instantiate internal VIP CP instances. These internal VipCpds are aggregated by the aggregatorExtCp and exposed as one extCpd. See note. |
| (inherited attributes) | | | | All attributes inherited from Cpd. |

NOTE:
at least one intCpd or one vipCpd shall be included in the IE.

Table 1. New aggregatorExtCpd IE

Figure 4:
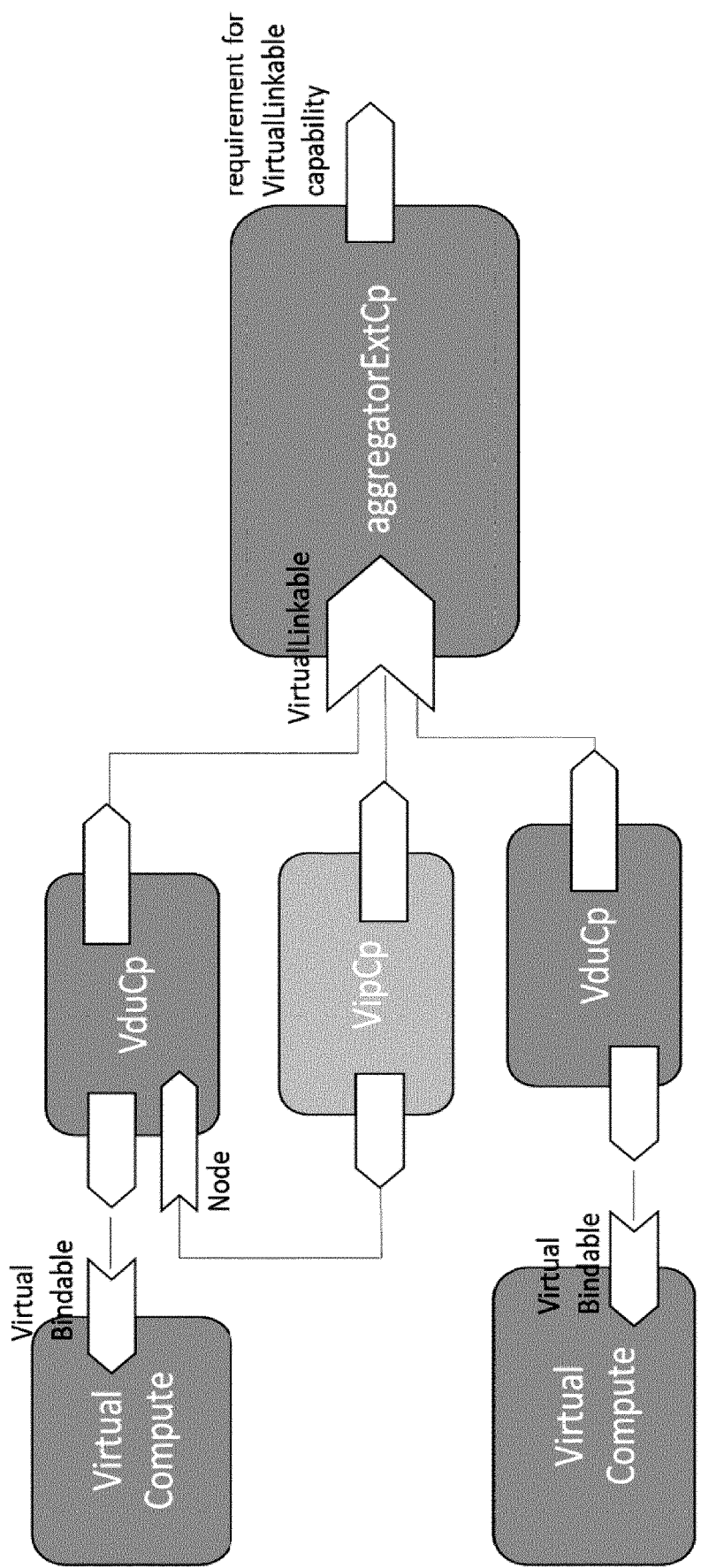
FIG. 4 is a block diagram depicting use of a special CP (aggregatorExtCp) in the TOSCA specification according to embodiments herein.

In TOSCA terms, i.e. in a TOSCA based VNFD, this is expressed by:
  a new aggregatorExtCp node which has:
    a VirtualLinkable capability (same capability exposed by virtual links)
    a requirement for a VirtualLinkable capability
    for internal CP nodes that are aggregated by the aggregatorExtCp:
      matching the requirement for a VirtualLinkable capability with the VirtualLinkable capability of the aggregatorExtCp This is shown in FIG. 4, which shows use of the aggregatorExtCp in the TOSCA VNFD.

The TOSCA node type definition of the new node is:

```
tosca.nodes.nfv.aggregatorExtCp:
  derived_from: tosca.nodes.nfv.Cp
  description: Describes a connection point to aggregate one or more
connection points and expose them as one single external connection
point.
  requirements:
    - virtual_link:
        capability: tosca.capabilities.nfv.VirtualLinkable
        relationship: tosca.relationships.nfv.AggregatorVirtualLinksTo
        occurrences: [1, 1]
  capabilities:
    virtual_linkable:
        type: tosca.capabilities.nfv.VirtualLinkable
```

It is herein proposed a usage of a novel CP node type, denoted also as a aggregating CP, aggregatorExtCp or special CP, to connect several CPs, to an external virtual link e.g. a NsVirtualLink. It can be noted that the aggregatorExtCp may use a specific relationship "AggregateVirtualLinksTo" when matching the requirement to a VirtualLinkable capability provided by a NsVirtualLink node. This allows the NSD designer to easily distinguish at a glimpse the requirement of this external CP from other external CPs, since this requirement (together with the relationship) is visible in the VNF node template.

Note that the aggregatorExtCp does not represent any real resource in the VIM, it is there to model the bridge from the CPs that are aggregated to the external virtual link.

As part of the NSD design it is determined to which NsVirtualLink the VnfExtCps are connected, in particular, the aggregatorExtCp that, as said, always acts as a VnfExtCp.

This may be done with the NsVirtualLinkConnectivity construct in the NSD that associates a certain CP, identifier of the CP Descriptor, to a certain NsVirtualLink, e.g. by means of a VirtualLinkProfile that points to a particular NsVirtualLink Descriptor.

Figure 5:
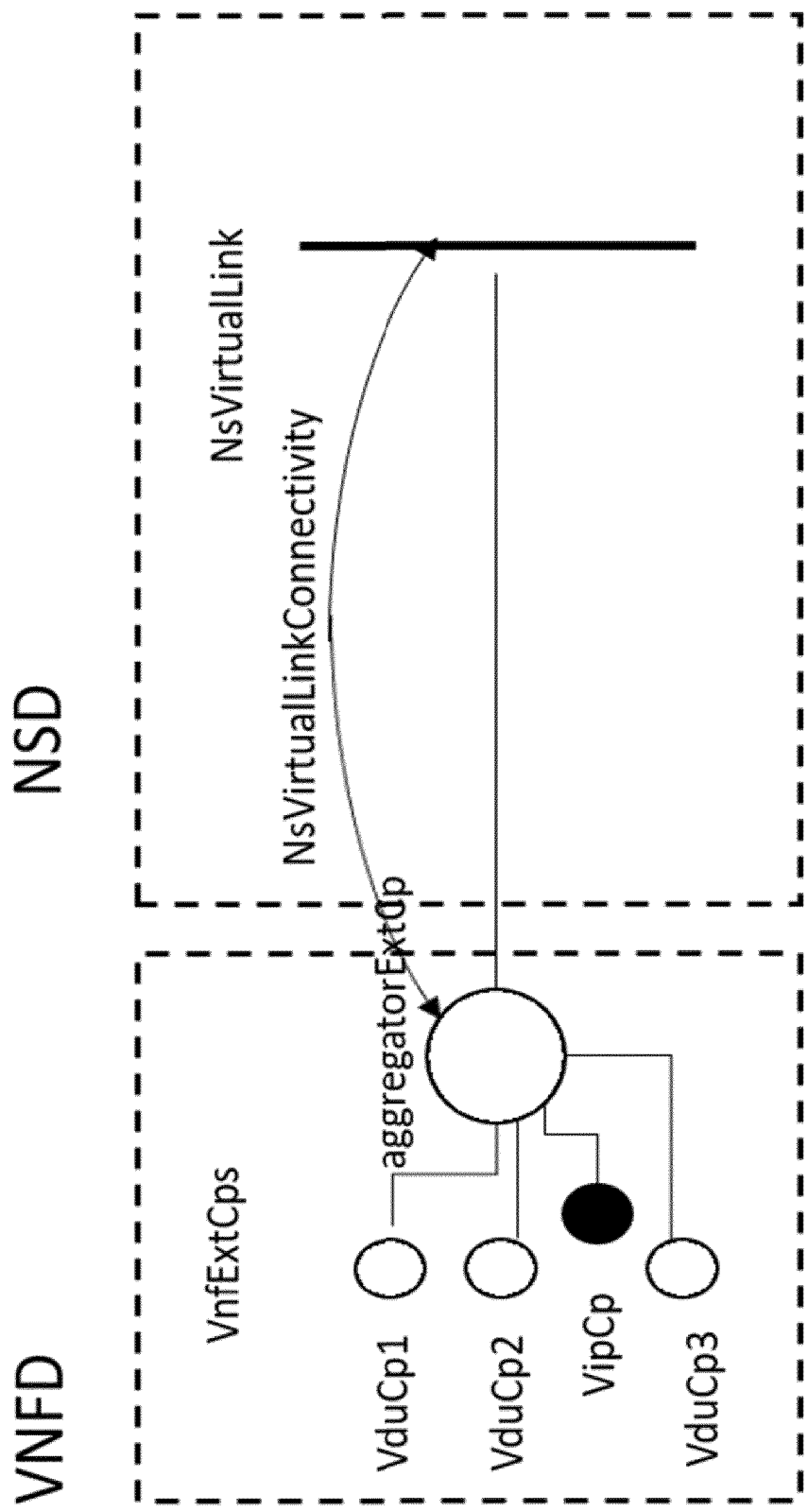
FIG. 5 is a block diagram depicting a special CP (aggregatorExtCp) according to embodiments herein.

The logical representation is shown in FIG. 5. FIG. 5 shows an illustration of the connectivity of the aggregating CP i.e. aggregatorExtCp using the existing NSD NsVirtualLinkConnectivity Information Element.

The NsVirtualLinkConnectivity Information Element in the NSD will be populated as follows:

| NsVirtualLinkConnectivity |
|---|
| VirtualLinkProfile of the NsVirtualLink Descriptor to which the aggregatorExtCp is connected |
| Identified of the aggregatorExtCp descriptor |

Note that the existing NsVirtualLinkConnectivity IE is not modified. It will simply point to the aggregatorExtCp instance.

If a new version of the VNFD changes the number of Cps aggregated by the aggregatorExtCp the NSD design would not be impacted: the NsVirtualLinkConnectivity will continue showing just one occurrence, i.e. one association between the aggregatorExtCp and the virtual link descriptor, being a benefit of embodiments herein.

It is herein shown a system and method at modelling time where the novel aggregatorExtCp node type is introduced.

Figure 6:
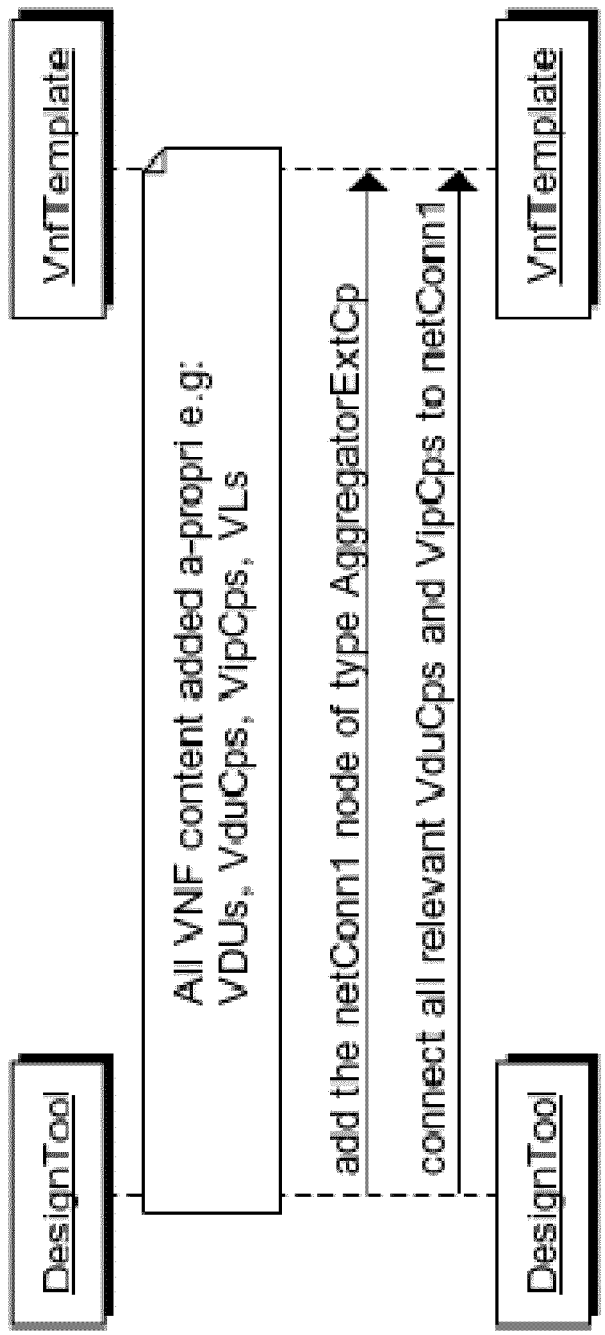
FIG. 6 is a block diagram depicting the methods used to add the model of the aggregating CP (aggregatorExtCp) in the VNFD model during the modelling according to embodiments herein.

FIG. 6 shows an illustration of a novel template design method. FIG. 6 presents the change in the template design method as the CPs are not connected (via TOSCA requirements) to the external link(s) but to the aggregatorExtCp. In turn the aggregatorExtCp is connecting towards the external link via a single TOSCA requirement.

Note that this process may be used in different embodiments:
within a design tool to assist a human designer
being automatically employed when translating from a graphical user interface (GUI) where the designer specifies a graphical representation or a constraint that several CPs need to be connected to the same external virtual link.

The design tool and the VnfTemplate configure by adding all VNF content a-priori such as VDUs, VduCps, VipCps, VnfExtCps, VLs. The design tool then adds a node denoted as netConn1 of type AggregatorExtCp to the VnfTemplate. The design tool further connects all relevant Cps (e.g. VduCp, VipCps, etc.) to netConn1 in the VnfTemplate.

Then the system and methods shown here are used to introduce the aggregatorExtCp into the model.
Handling of Configuration Data of CPs in Or-Vnfm.

System and method at runtime, where the example below describes an ETSI NFV orchestration embodiment:

Today NFVO configures the CP instances that are defined as VnfExtCps in the VNFD and sends this configuration to the VNFM via the Or-Vnfm reference point when instantiating the VNF as well as in cases of change of connectivity requests.

With embodiments disclosed herein, this behaviour in the NFVO is enhanced. The NFVO will configure all CP instances aggregated by an aggregatorExtCp and send the configuration data to the VNFM as part of the extVirtualLinkData of the specific virtual link instance to which the aggregatorExtCp is connected. The runtime system is shown in FIG. 7 and the method is shown in FIG. 8.

Figure 7:
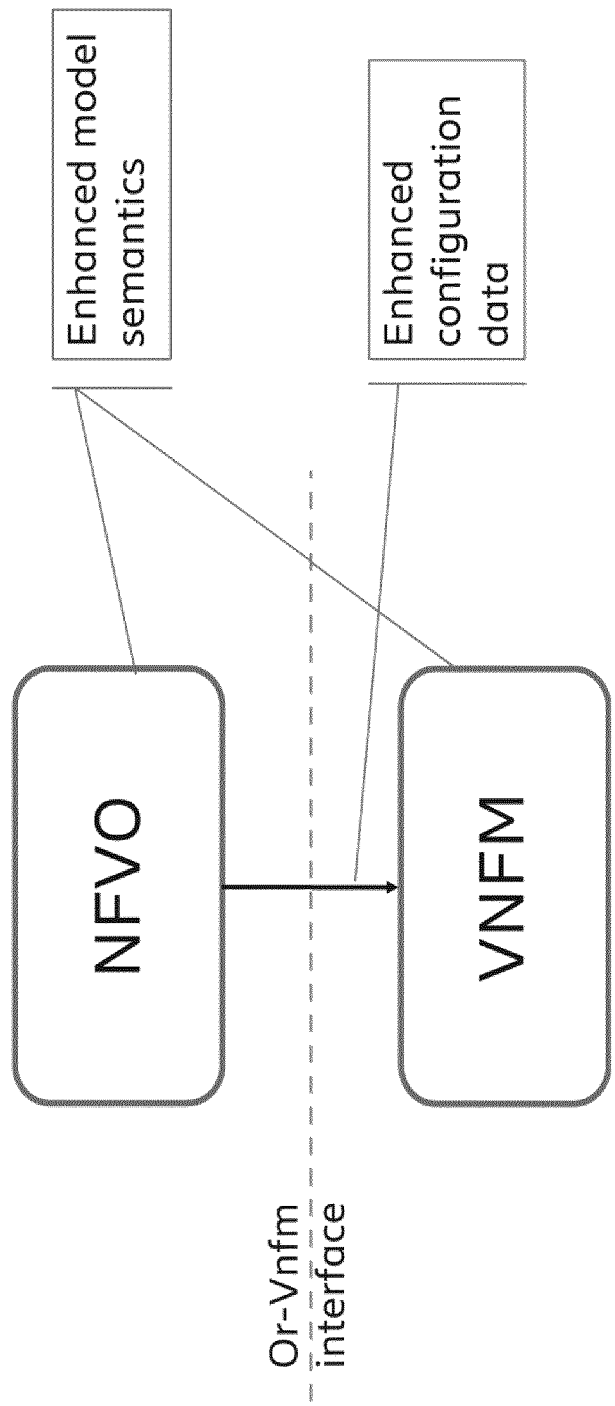
FIG. 7 is a flowchart depicting the runtime system according to embodiments herein.

FIG. 7 presents a system and method at runtime, where the examples describe an ETSI NFV orchestration embodiment of the controlling network node 14. The controlling network node 14 may comprise a normal NFVO to VNFM interaction via the Or-Vnfm interface. The difference is that the configuration data is enhanced by the presence of the aggregatorExtCp in the VNFD model. The aggregatorExtCp is not a real CP, it has no VIM resource associated, so no configuration data will be sent for the aggregatorExtCp in the configuration data.

Figure 8:
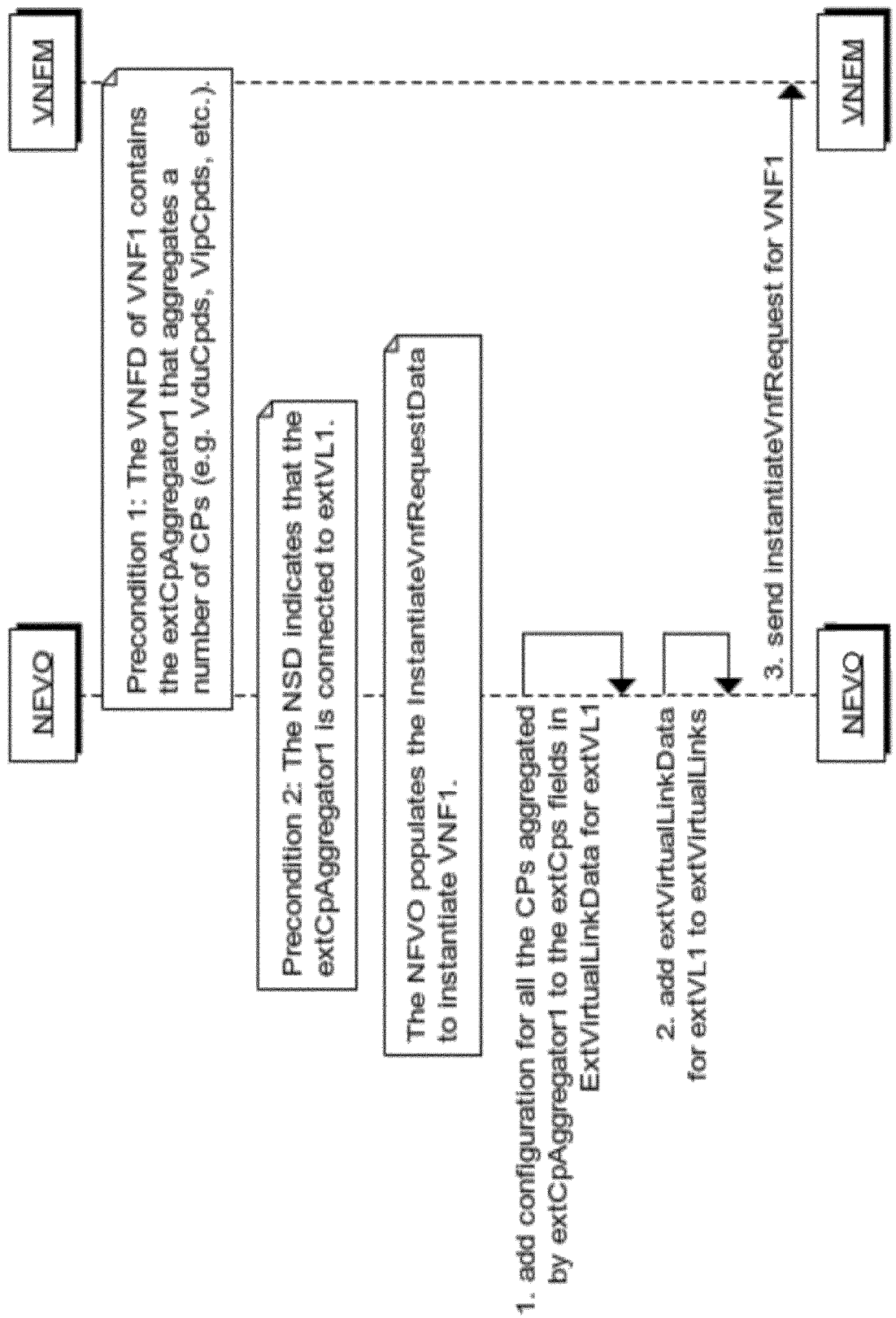
FIG. 8 is a schematic diagram for creation and transmission of configuration data during runtime according to embodiments herein.

FIG. 8 presents a method, by the controlling network node, which the configuration data for an external VL is built in the NFVO before a Vnflcm operation is sent from the NFVO to the VNFM (e.g. an instantiate, scale, or ChangeExtVnfConnectivity requests). Precondition 1: The VNFD of a VNF denoted as VNF1 contains an extCpAggregator denoted as extCpAggregator1 that aggregates a number of CPs (e.g. VduCpds, VipCpds, etc.). Precondition 2: The NSD indicates that extCpAggregator1 is connected to an external virtual link denoted as extVL1. The NFVO populates the InstantiateVnfRequestData to instantiate VNF1. NFVO adds configuration for all the CPs aggregated by extCpAggregator1 to the extCps fields in ExtVirtualLinkData for extVL1. Furthermore, extVirtualLinkData for extVL1 is added to extVirtualLinks. The NFVO then sends the InstantiateVnfRequest for VNF1 to the VNFM. It should be emphasized that all aggregated Cps are connected to the same external VL, extVL1 in this case, as a result of a formal specification in the VNFD.

Figure 9:
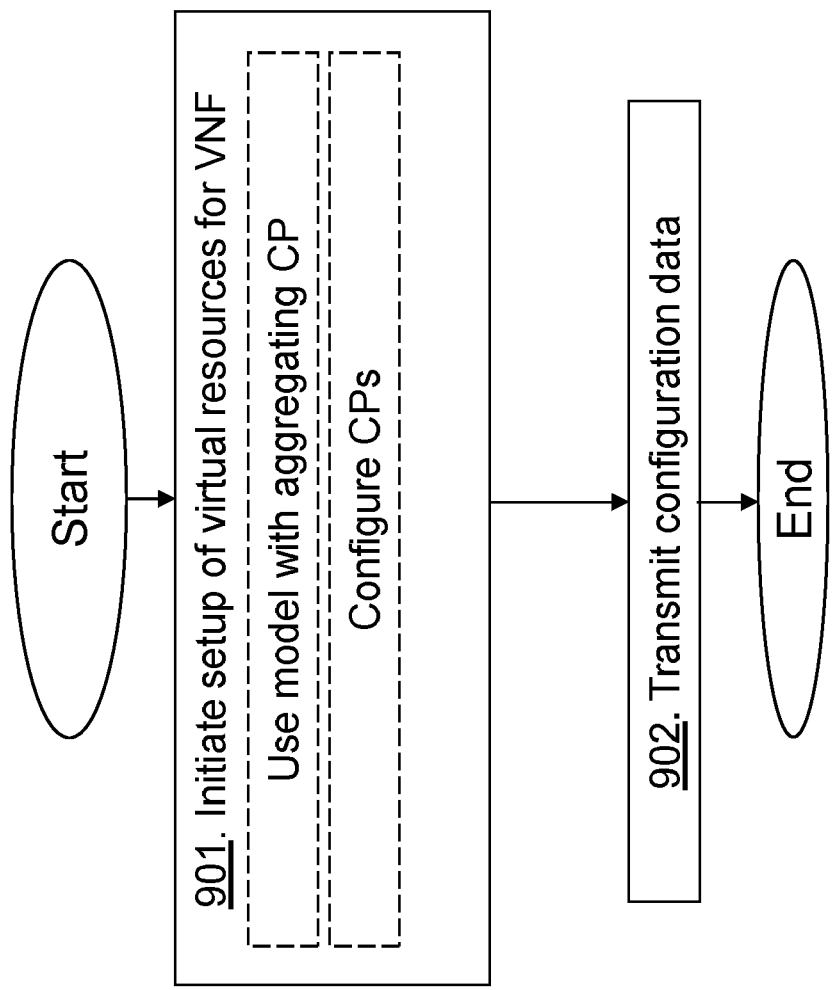
FIG. 9 is a schematic flowchart depicting a method performed by a controlling network node according to embodiments herein.

The method actions performed by the controlling network node 14 which may be a distributed node comprising an orchestrator and a VIM or VNFM for handling one or more VNFs in the communication network 1 according to embodiments will now be described with reference to a flowchart depicted in FIG. 9. The actions do not have to be taken in the order stated below, but may be taken in any suitable order. Actions performed in some embodiments are marked with dashed boxes.

Action 901. The controlling network node 14 initiates the setup of virtual resources for the VNF wherein the special CP, i.e. the aggregating CP indicates the set of CPs to be connected to the same external virtual link or network, thus, the aggregating CP is configured for connecting the set of CPs to the same external virtual link.

E.g. the controlling network node 14 may use a model of the VNF with the aggregating CP for connecting the set of CPs to the same external virtual link, for example in addition to the VNFs network interfaces, its storage needs, its compute resource needs, its supported instantiation levels, supported deployment variations, and lifecycle management operations. The set of CPs may comprise a respective requirement of a virtual linkable capability matching a requirement for a virtual linkable capability of the aggregating CP.

Action 902. The controlling network node 14 for example the orchestrator, transmits configuration data to the managing function wherein the configuration data comprises the indication to connect the set of CPs, grouped by the aggregating CP, to the same external virtual link, e.g. may transmit indications on how to connect the set of CPs to the same external virtual link. The controlling network node 14 may initiate the setup by configuring all CPs aggregated by the aggregating CP and the configuration data may be transmitted to the managing function as part of an external link data of an external link to which the aggregating CP is connected.

Figure 10:
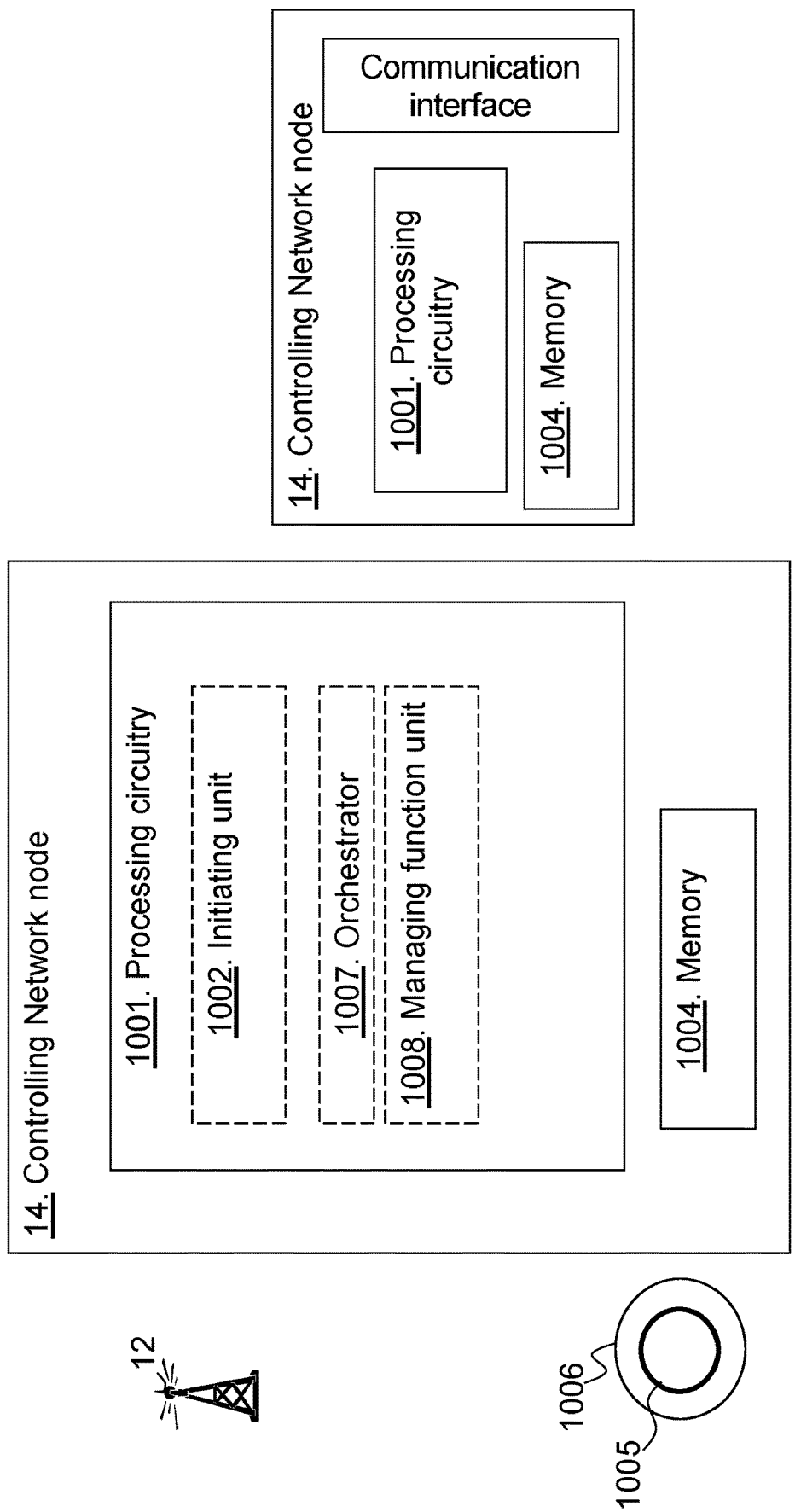
FIG. 10 is a block diagram depicting a controlling network node according to embodiments herein.

FIG. 10 is a block diagram depicting the controlling network node 14 for handling one or more VNFs in the communication network according to embodiments herein.

The controlling network node 14 may comprise processing circuitry 1001, such as one or more processors, configured to perform methods herein.

The controlling network node 14 may comprise a initiating unit 1002, e.g. a transmitter or transceiver. The controlling network node 14, the processing circuitry 1001, and/or the initiating unit 1002 is configured to initiate the setup of virtual resources for a VNF wherein a special connection point type, i.e. the aggregating CP, indicates the set of CPs to be connected to the same external virtual link or network, thus, the aggregating CP may be configured for connecting the set of CPs to the same external virtual link. The set of CPs may comprise a respective requirement of a virtual linkable capability matching a requirement for a virtual linkable capability of the aggregating CP. Thus, the controlling network node 14, the processing circuitry 1001, and/or the initiating unit 1002 may be configured to use the model of the VNF with the aggregating CP for connecting the set of CPs to the same external virtual link, and may further use the model in addition to e.g. the VNFs network interfaces, its storage needs, its compute resource needs, its supported instantiation levels, supported deployment variations, and lifecycle management operations. The controlling network node 14, the processing circuitry 1001, and/or the initiating unit 1002 is configured to transmit configuration data, e.g. from the orchestrator 1007, to the managing function unit 1008 wherein the configuration data comprises indication to connect the set of CPs, grouped by the aggregating CP, to the same external virtual link, e.g. may transmit indications on how to connect the set of CPs to the same external virtual link. The controlling network node 14, the processing circuitry 1001, and/or the initiating unit 1002 may be configured to initiate the setup by configuring all CPs aggregated by the aggregating CP and the configuration data may be transmitted to the managing function as part of an external link data of an external link to which the aggregating CP is connected.

The controlling network node 14 further comprises a memory 1004. The memory comprises one or more units to be used to store data on, such as requests, models, CPs, set of CPs, aggregated Cps, virtual linkable capability of CPs, templates, applications to perform the methods disclosed herein when being executed, and similar. The controlling network node 14 may comprise a communication interface comprising e.g. a receiver, a transmitter, and/or a transceiver. Thus, it is herein provided the controlling network node 14 for handling communication in the communication network, wherein the controlling network node comprises processing circuitry and a memory, said memory comprising instructions executable by said processing circuitry whereby said controlling network node is operative to perform any of the methods herein.

The methods according to the embodiments described herein for the controlling network node 14 are respectively implemented by means of e.g. a computer program product 1005 or a computer program, comprising instructions, i.e., software code portions, which, when executed on at least one processor, cause the at least one processor to carry out the actions described herein, as performed by the controlling network node 14. The computer program product 1005 may be stored on a computer-readable storage medium 1006, e.g. a disc, a universal serial bus (USB) stick or similar.

The computer-readable storage medium 1006, having stored thereon the computer program product, may comprise the instructions which, when executed on at least one processor, cause the at least one processor to carry out the actions described herein, as performed by the controlling network node 14. In some embodiments, the computer-readable storage medium may be a transitory or a non-transitory computer-readable storage medium.

It is herein further disclosed a method performed by a design tool that either automatically creates or assists a designer to model the VNF with the aggregating connection point type for aggregating and connecting the set of CPs to a same external virtual link, in addition to the VNFs network interfaces, its storage needs, its compute resource needs, its supported instantiation levels, supported deployment variations, and lifecycle management operations.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Figure 11:
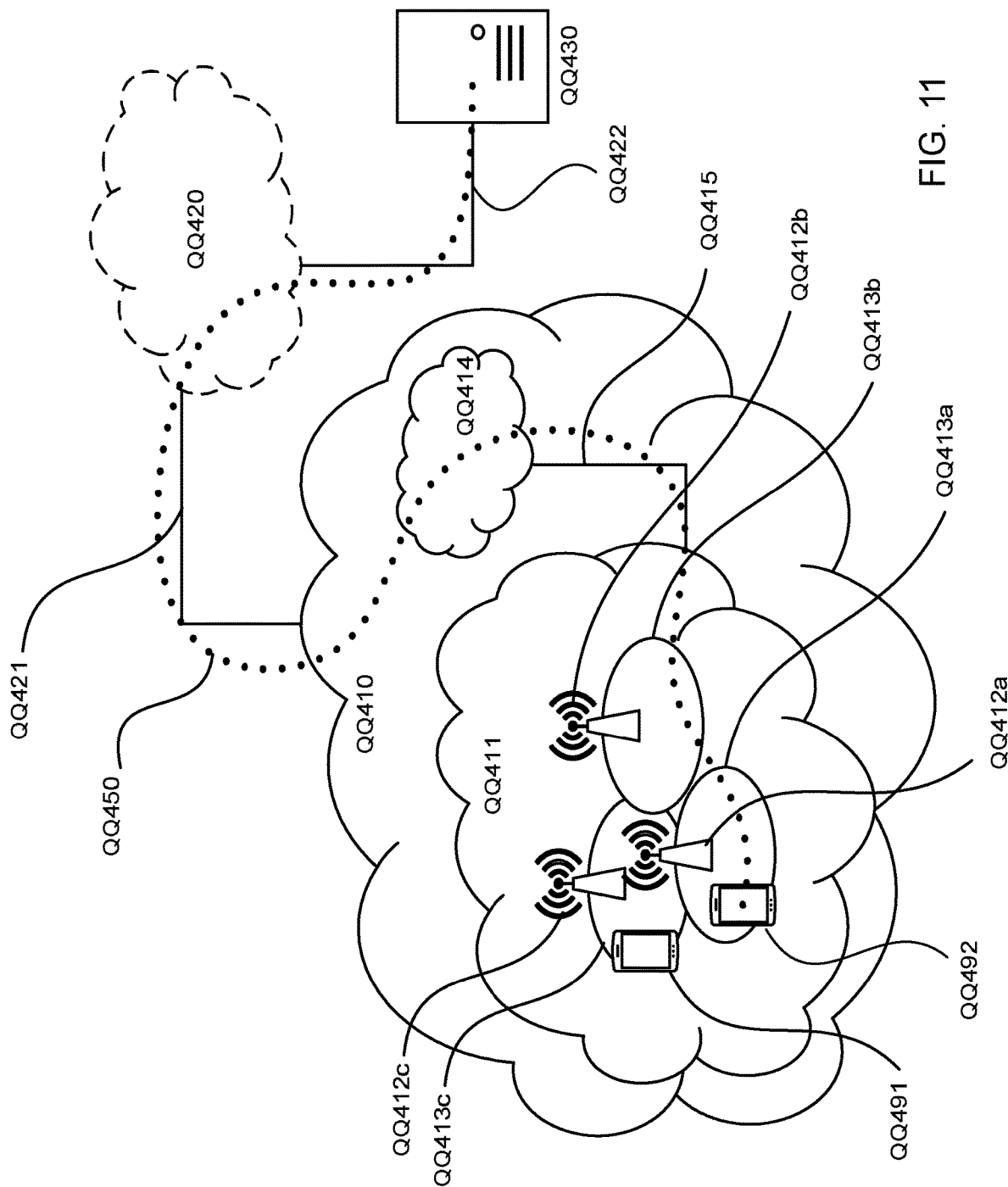
FIG. 11 shows a telecommunication network connected via an intermediate network to a host computer in accordance with some embodiments.

FIG. 11: Telecommunication network connected via an intermediate network to a host computer in accordance with some embodiments With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points being examples of the radio network node 12 above, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example being examples of the wireless device 10 above, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 12:
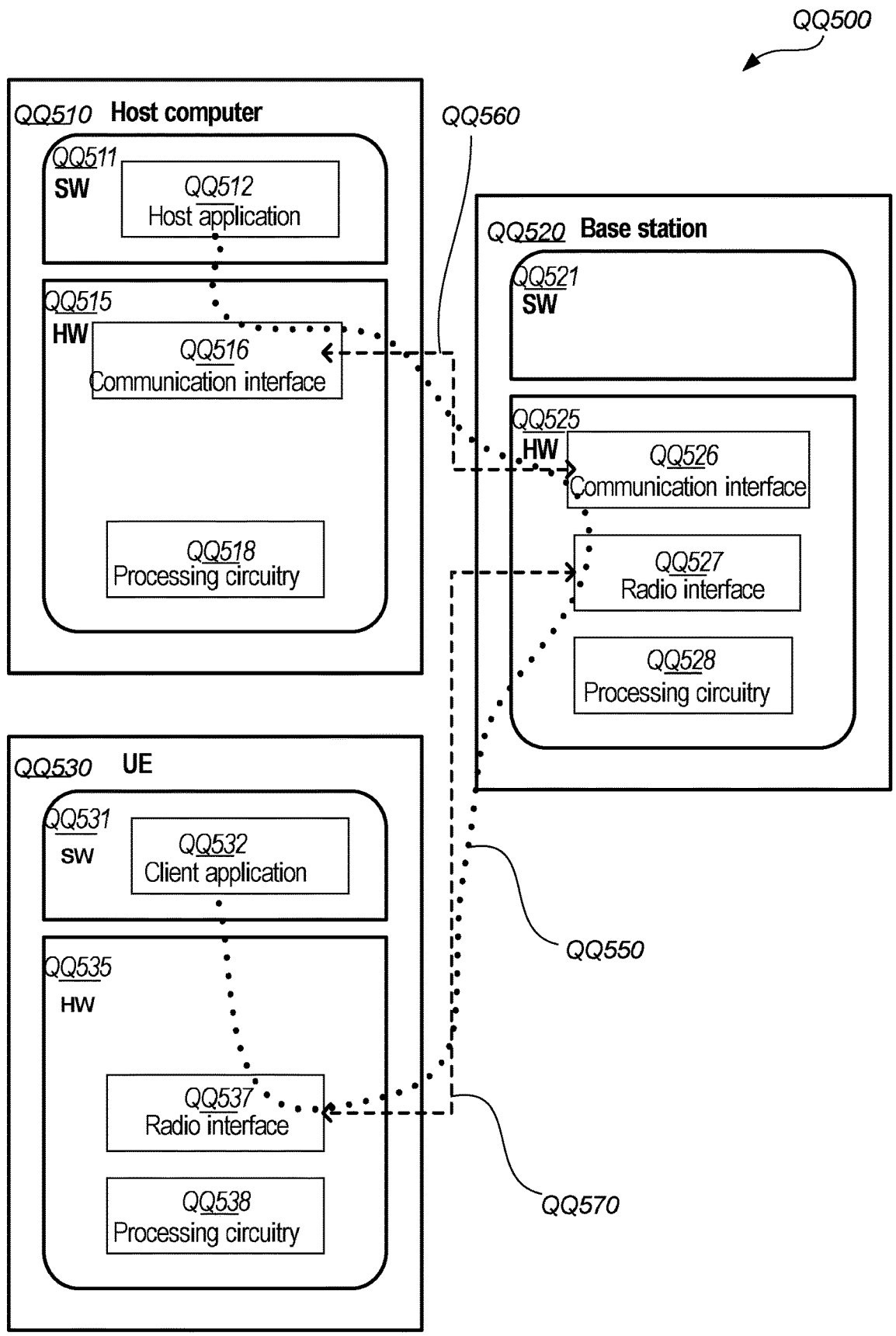
FIG. 12 shows a host computer communicating via a base station with a user equipment over a partially wireless connection in accordance with some embodiments.

FIG. 12: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency since modelling a VNF and/or configuring managing function e.g. VNFM is performed efficiently and leading to an improved performance of the communication network when handling VNFs and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signalling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
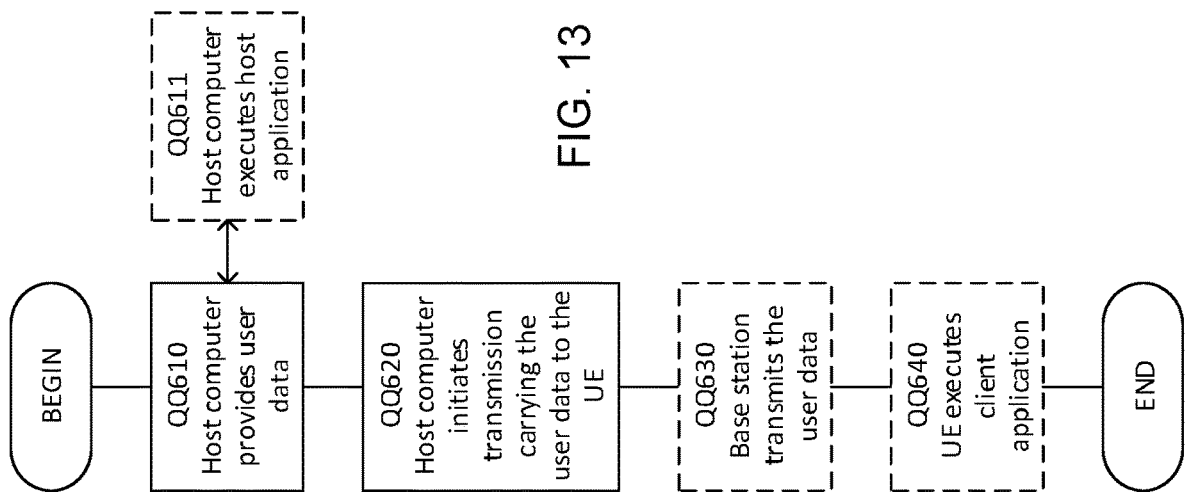
FIG. 13 shows methods implemented in a communication system including a host computer, a base station and a user equipment in accordance with some embodiments.

FIG. 13: Methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 14:
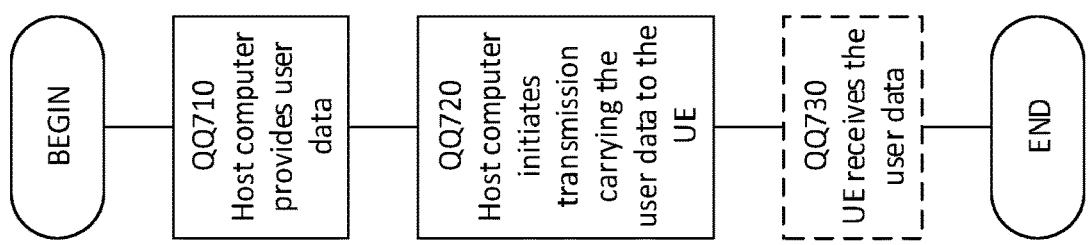
FIG. 14 shows methods implemented in a communication system including a host computer, a base station and a user equipment in accordance with some embodiments.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
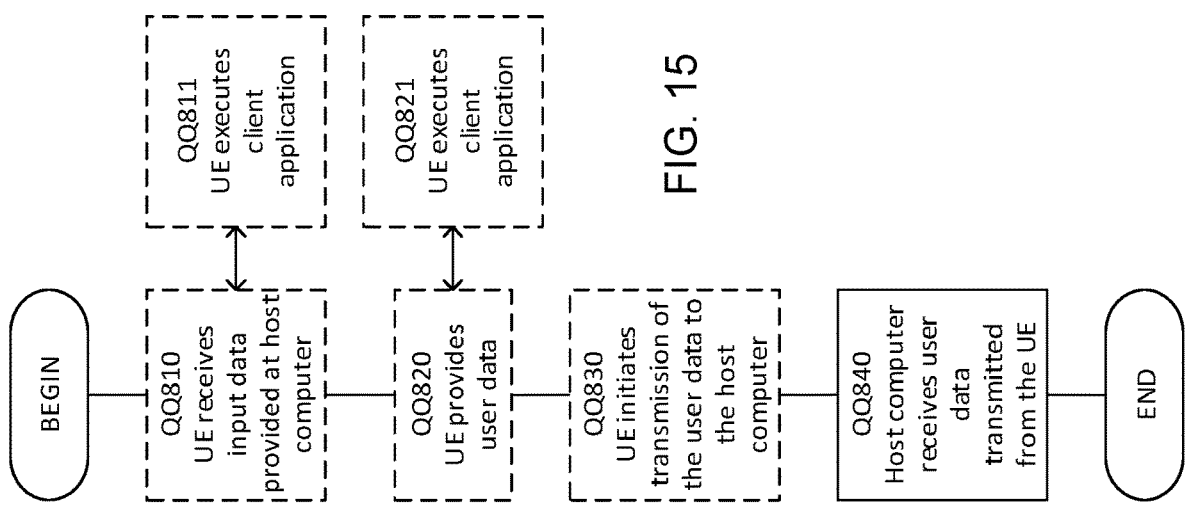
FIG. 15 shows methods implemented in a communication system including a host computer, a base station and a user equipment in accordance with some embodiments.

FIG. 15: Methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 16:
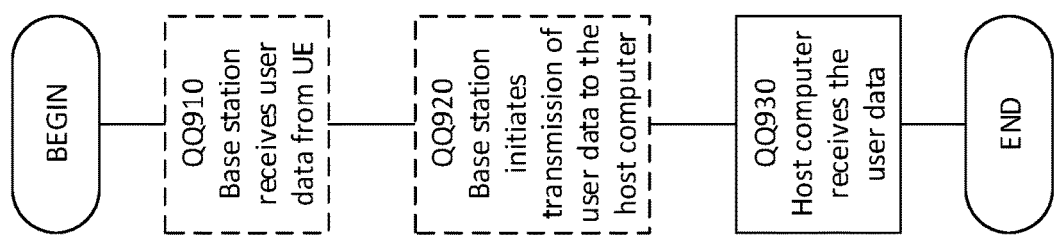
FIG. 16 shows methods implemented in a communication system including a host computer, a base station and a user equipment in accordance with some embodiments.

FIG. 16: Methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node or UE, for example.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviations
  NFV-MANO ETSI NFV Lifecycle Management and Orchestration architecture
  NFV Network Function Virtualization
  NFVI NFV Infrastructure resources (compute, storage, networking)
  NFVO NFV Orchestrator
  VIM Virtualization Infrastructure Manager
  VNF Virtualized Network Function
  VNFM VNF Manager

REFERENCES

1. ETSI GS NFV-IFA011
2. ETSI GS NFV-SOL001
3. ETSI GS NFV-SOL003

The invention claimed is:

1. A method performed by a controlling network node for handling one or more virtual network functions, VNF, in a communication network, the method comprising:
   initiating a setup of virtual resources for a VNF, wherein an aggregating connection point, CP, indicates a set of CPs to be connected to a same external virtual link; and
   transmitting configuration data to a managing function wherein the configuration data comprises an indication to connect the set of CPs, grouped by the aggregating CP, to the same external virtual link, wherein initiating the setup comprises configuring all CPs aggregated by the aggregating CP and the configuration data is transmitted to the managing function as part of an external link data of an external link to which the aggregating CP is connected.

2. The method according to claim 1, wherein initiating the setup comprises:
   using a model of the VNF with the aggregating connection point for aggregating and connecting the set of CPs to a same external virtual link.

3. The method according to claim 1, wherein the set of CPs comprises a respective requirement of a virtual linkable capability matching a requirement for a virtual linkable capability of the aggregating CP.

4. A controlling network node for handling one or more virtual network functions, VNF, in a communication network, wherein the controlling network node is configured to:
   initiate a setup of virtual resources for a VNF wherein an aggregating connection point, CP, indicates a set of CPs to be connected to a same external virtual link; and
   transmit configuration data to a managing function wherein the configuration data comprises an indication to connect the set of CPs grouped by the aggregating CP, to the same external virtual link, wherein the controlling network node is configured to configure all CPs aggregated by the aggregating CP and configured to transmit the configuration data to the managing function as part of an external link data of an external link to which the aggregating CP is connected.

5. The controlling network node according to claim 4, wherein the controlling network node is configured to:
   use a model of the VNF with the aggregating CP for aggregating and connecting the set of CPs to a same external virtual link.

6. The controlling network node according to claim 4, wherein the set of CPs comprises a respective requirement of a virtual linkable capability matching a requirement for a virtual linkable capability of the aggregating CP.

7. The controlling network node according to claim 4, wherein the controlling network node is an NFV MANO node.

8. A computer program product comprising instructions, which, when executed on at least one processor, cause the at least one processor to:
   initiate a setup of virtual resources for a virtual network function, VNF, wherein an aggregating connection point, CP, indicates a set of CPs to be connected to a same external virtual link; and
   transmit configuration data to a managing function wherein the configuration data comprises an indication to connect the set of CPs, grouped by the aggregating CP, to the same external virtual link, wherein to initiate comprises configuring all CPs aggregated by the aggregating CP and the configuration data is transmitted to the managing function as part of an external link data of an external link to which the aggregating CP is connected.

9. The computer program product according to claim 8, wherein to initiate comprises using a model of the VNF with the aggregating connection point for aggregating and connecting the set of CPs to a same external virtual link.

10. The computer program product according to claim 8, wherein the set of CPs comprises a respective requirement of a virtual linkable capability matching a requirement for a virtual linkable capability of the aggregating CP.

\* \* \* \* \*